United States Patent [19]
Yoshibe et al.

[11] Patent Number: 5,523,892
[45] Date of Patent: Jun. 4, 1996

[54] LENS BARREL

[75] Inventors: Koushi Yoshibe, Kawasaki; Hiroshi Okano, Tokyo; Nobuhiko Terui, Ichikawa, all of Japan

[73] Assignee: Nikon Corporation, Tokyo, Japan

[21] Appl. No.: 356,122

[22] Filed: Dec. 15, 1994

[30] Foreign Application Priority Data

Dec. 15, 1993 [JP] Japan .................................. 5-342283
Dec. 15, 1993 [JP] Japan .................................. 5-342284
Dec. 15, 1993 [JP] Japan .................................. 5-342726

[51] Int. Cl.⁶ .................................................. G02B 7/02
[52] U.S. Cl. .................... 359/819; 359/825; 359/694; 359/699; 354/485; 361/749
[58] Field of Search .................... 359/819, 823, 359/825, 694, 697, 698, 699; 354/485, 400, 401, 402, 403, 404; 361/749, 784, 816

[56] References Cited

U.S. PATENT DOCUMENTS

| | | | |
|---|---|---|---|
| 4,864,348 | 9/1989 | Fuziwara et al. | 354/485 |
| 4,951,083 | 8/1990 | Okura et al. | 354/485 |
| 4,964,697 | 10/1990 | Fuziwara | 354/485 |
| 4,990,948 | 2/1991 | Sasaki et al. | 354/485 |
| 5,204,806 | 4/1993 | Sasaki et al. | 361/749 |
| 5,231,449 | 7/1993 | Nomura | 354/485 |
| 5,349,475 | 9/1994 | Nomura et al. | 359/694 |

*Primary Examiner*—Loha Ben
*Attorney, Agent, or Firm*—Staas & Halsey

[57] ABSTRACT

A lens barrel having a fixed cylinder for holding a photographic optical system, and a rotary cylinder surrounding the fixed cylinder which is provided with a fitting portion for holding the rotary cylinder rotatively, and also, a diametral portion whose diameter is smaller than this fitting portion. The lens barrel further having a printed-circuit board having electric components assembled thereon. This printed-circuit board is arranged on the aforesaid diametral portion of the fixed cylinder in the space formed between the inner circumference of the rotary cylinder and the diametral portion.

14 Claims, 3 Drawing Sheets

LENS BARREL

BACKGROUND OF THE INVENTION

1. Field of the Invention

This invention relates to a lens barrel which is attachable to or detachable from a single-lens reflex camera, for example. More particularly, the invention relates to a lens barrel suitably applicable when a printed-circuit board having various electrical components assembled thereon is incorporated in the portion formed by a fixed cylinder and a rotational cylindrical member comprising a rotary cylinder and others rotatively fitted onto the external side of the fixed cylinder.

Also, the invention relates to a lens barrel which is provided with an image-blur preventive mechanism comprising an optical system for preventing images from being blurred by a camera-shake or the like, and an image-blur preventive driving mechanism to drive this optical system.

Further, the invention relates to an apparatus for incorporating a blur detection sensor which is suitably applicable to a lens barrel provided with an image-blur preventive mechanism comprising an optical system for preventing images from being blurred by a camera-shake or the like, and an image-blur preventive driving mechanism to drive this optical system.

2. Related Background Art

In an exchangeable lens barrel which is detachably mountable on a single-lens reflex camera, for example, there are incorporated, among others, a zooming mechanism capable of variably adjusting the focal length of a photographic lens system from a telescopic angle to a wide angle, an AF (autofocus mechanism) capable of automatically setting focus on an object to be photographed.

Particularly, in the lens barrels in recent years, an image-blur preventive mechanism is also incorporated for compensating the camera-shake or the like caused by a photographer. There is a conspicuous tendency to make the function of the lens barrel increasingly multiple.

Along with the above-mentioned provision of the multiple function, there are incorporated in a lens barrel of the kind, various driving mechanisms, circuit controllers, and sensors for detecting various pieces of information, among others, together with the optical system using various photographic lenses. Therefore, the implementation of more effective utilization of space in the lens barrel is demanded.

Particularly, according to a lens barrel of the kind, its size is determined to a certain extent by the aperture and others of the optical system of the photographic lens to be incorporated in it. Thus it is not desirable to make its size larger than necessary. Therefore, the dead space in the lens barrel should be efficiently utilized to the utmost in order to arrange an effective assembling of the various driving mechanisms including an electric motor and others, the circuit controller formed by the electric circuits and the like, and also, sensors, among others.

Now, the lens barrel described above is provided with a fixed cylinder as the main body of the barrel, and on the external side thereof, a rotational cylindrical member is rotatively installed to provide various operational rings and the like. At the same time, there are arranged in the fixed cylinder, a supporting cylinder for the optical system of photographic lenses, and a movable cylinder for adjusting the required optical lens system to shift in the direction of the optical axis or in the direction orthogonal to the optical axis, and also, a driving mechanism thereof.

Also, it is necessary to arrange and incorporate the driving circuits for controlling the various driving mechanisms described above, the various sensors for detecting the current status of the camera, and further, wiring means such as a flexible printed board (hereinafter referred to as an FPC) for connecting these elements in appropriate locations in the lens barrel.

However, in a conventional lens barrel, the following problems are encountered when actually installing a circuit assembly formed by the FPC having the driving circuits arranged on it to receive signals from the controllers of the various driving mechanisms, the sensors, and others in a location where the rotary cylinder is rotatively fitted onto the outer circumference of the fixed cylinder.

In other words, since the rotary cylinder is fitted onto the outer circumference of the fixed cylinder, it is impossible to mount the circuit assembly such as the FPC board and others in this portion.

Therefore, it is conventionally practiced that when installing the circuit assembly such as the FPC board, a part of the installation member such as a bent plate affixed to the portion other than the aforesaid fitting portion of the fixed cylinder is extended to the space formed between the outside of the rotary cylinder and the external cover of the lens barrel, and then, the circuit assembly arranged by the FPC board and others is mounted at the extended end thereof to implement the actual assembling.

Therefore, in a conventional structure of the kind, there is a need for using a bent plate and other installation members to mount the circuit assembly arranged by the FPC board and others, hence leading to the problems of the increased number of parts, the complicated workability of assemblies following it, and the eventual increase of the manufacturing cost, among others.

Also, the mounting portion at the extended end of the installation member such as a bent plate is a fixed part, thus necessitating an escape between this fixed part and the rotary cylinder. Therefore, the rotary cylinder, the bent plate, and others are restricted to the extent that such an escape should be arranged. This results in a problem that the area of the available space is reduced for the installation of the circuit assembly formed by the FPC board and others.

Now, in the conventional lens barrel having the image-blur preventive function in it, the image-blur preventive driving mechanism for driving the blur prevention lens, and a blur detection sensor for detecting the blur condition, such as a camera-shake caused by the photographer, are arranged by connecting them to one and the same member, that is, one flexible printed-circuit board (hereinafter referred to as an FPC board), for example. As a result, the problems are inevitably encountered as given below.

In other words, in an image-blur preventive mechanism of the kind, a blur detection sensor is arranged on the X- and Y-axis sides, respectively, in order to detect the blurring condition due to the camera-shake or the like caused by the photographer with respect to the camera, or the lens barrel, in the directions of the orthogonal two axes, that is, the X- and Y-axis directions, on the plane perpendicular to the optical axis of the lens. Therefore, a severe adjustment should be made to position these sensors.

However, in order to position the sensors on the X- and Y-axis sides by adjusting its positions, it is necessary to conduct a fine adjustment for each of the sensors and a rotational adjustment of the fixed cylinder as well. In such a case, if the image-blur preventive driving mechanism and others are mounted integrally on the portion of the fixed cylinder as described earlier, these elements must also be allowed to rotate.

Then, when the image-blur preventive driving mechanism and others are caused to rotate together, these driving mechanism and others may become a source for defectiveness. Also, the rotation of an element having a heavy weight, such as the driving mechanism may cause defective adjustment of the blur detection sensor defective or difficulty in making an appropriate adjustment.

Particularly, in the above-mentioned image-blur preventive driving mechanism, its position must be adjusted rigidly in the same manner as the sensor. It is imparative, therefore, that the relative positioning should be carried out between these two members. Therefore, the adjustment and other related operations are not only complicated, but also create the problem wherein accurate adjustments become difficult to make. In addition a considerable time and labor is required to build in the FPC board in these portions.

Also, in the conventional lens barrel, an AF mechanism and others are arranged with respect to the fixed cylinder which is a fixed member formed in a series in the fixed cylinder unit. Thus an adjustment operation is needed for a portion where an AF mechanism of the kind is installed with some others. Under such circumstances, it is desired that the workability should be improved, and at the same time, the accuracy of the assembling should be secured in a better condition.

Therefore, in a lens barrel of the kind having the aforesaid image-blur preventive function in it, considerations must also be given to the assembling workability in a portion where the AF mechanism is incorporated. Further, a formation of wiring is required to be arranged in this portion, too, by use of an FPC board and others. As a result, considerations should be given equally to the wiring structure and others for the entire body of the lens barrel including the wiring connection with this AF mechanism. Hence it is desired that some measure should be taken to meet all these requirements satisfactorily.

Now, in a lens barrel of the kind having the above-mentioned image-blur preventive function in it, when arranging on the fixed member of the barrel a printed-circuit board having a blur detection sensor assembled thereon, it is conceivable that lead lines can be used to connect the blur detection sensor externally with a circuit controller which controls a blue preventive driving mechanism and others, for example, and that such connection can be made by soldering the lead lines directly on the printed-circuit board where the blur detection sensor is assembled.

However, a connecting method of the kind which uses lead lines requires a plurality of lead lines to be fixed by soldering them on given locations of the assembly board in an extremely limited space. Thus, not only is the operation difficult, but also a considerable time is required to complete this operation.

Particularly, for the blur detection sensor, it is necessary, among others, to adjust its fixing position and posture rigidly with respect to the fixed member. Hence a problem is created as given below when carrying out the positional adjustment of the blur detection sensor and connections by use of the lead lines.

In other words, the position of the blur detection sensor is adjusted once, and then, the above-mentioned plurality of lead lines should be soldered in a state that the assembly board is fixed to the fixed member. Therefore, if the blur detection sensor should be displaced during this soldering work, there is a need for the lead lines to be removed. Then the adjustment should be made again, and only after that, the soldering can be resumed.

Also, considerations must be given so that when the lead lines are arranged and soldered after the execution of the positional adjustment of the blur detection sensor as described above, the lead lines should be prevented from being in contact with the blur detection sensor. This precaution is necessary because if any one of the lead lines abuts upon the blur detection sensor, it can be a cause of presenting detection errors. An occurrence of the kind of event should be avoided under any circumstances.

Here, another problem is encountered wherein it takes a considerable time and labor to execute this work carefully so as to avoid any contact between the lead lines and the blur detection sensor.

Particularly, in the above-mentioned lens barrel, each of the blur detection sensors for the image-blur prevention is arranged on the X- and Y-axis side in order to detect the condition of blur resulting from the camera-shake caused by the photographer with respect to the camera, or the lens barrel. Here, the problem of workability as described above presents itself more conspicuously. Therefore, it is demanded that some measures be taken to solve these problems.

SUMMARY OF THE INVENTION

The present invention is designed in consideration of these aspects of problems. It is an object of the invention to obtain a lens barrel which makes it possible to curtail the number of constitutional parts as a whole, enhance the workability and assembling capability, and further, to reduce the manufacturing cost by providing a circuit assembly formed by arranging it on a fixed cylinder, onto which a rotational cylindrical member is fitted; a printed-circuit board such as an FPC having various electric components assembled on it; and its assembling area to be secured at the same time.

In order to meet such a requirement as this, there is provided for a lens barrel according to the present invention a small diametral portion whose diameter is smaller than the fitting portion where the rotational cylindrical member of a fixed cylinder is fitted in order to assemble and arrange the printed-circuit board having various electric components thereon outside the fixed cylindrical unit where the rotational cylindrical member is fitted. Then the printed-circuit board is assembled and arranged on this small diametral portion in the space formed by the outside of the small diametral portion and the rotational cylindrical member.

Also, according to a lens barrel of the present invention, there are provided a supporting cylinder which supports the photographic optical system in the fixed cylinder; a movable cylinder which is mounted on this supporting cylinder and movably supported at the same time in the direction of the optical axis by being fitted into the inner circumference of the fixed cylinder; and a pair of interlocking pins planted on this movable cylinder. These interlocking pins are arranged to fit into the guiding grooves formed by a straight key groove and a spiral groove provided respectively for the fixed cylinder and the rotational cylindrical member fitted onto it, thus enabling the movable cylinder to shift in the direction of the optical axis.

In accordance with the present invention, an assembling unit which enables the direct assembling of a printed-circuit board such as an FPC board outside the small diametral portion provided for the fixed cylinder, and unlike the prior art, it is possible to dispense with the bent plate and other installation parts which should otherwise be arranged extendedly around the rotational cylindrical member. Therefore, the structure can be simplified, hence making it possible to solve the problems of the workability, assembling capability, and increased manufacturing cost.

Also, in accordance with the present invention, the pair of interlocking pins for enabling the movable cylinder supported movably in the direction of the optical axis in the fixed cylinder to shift in the direction of the optical axis are arranged to fit in the guiding grooves formed the straight key groove and spiral grooves provided respectively for the fixed cylinder and the rotational cylindrical member fitted onto it. Hence the movable cylinder and the photographic optical system provided for it are caused to shift forward and backward in the direction of the optical axis in a given state following the rotation of the rotational cylindrical member.

It is another object of the invention to obtain a lens barrel which makes it possible to enhance the assembling capability and reliability including the adjustment operation for positioning the assembling units in the lens barrel where an image-blur preventive driving mechanism and a blur detection sensor are incorporated, and to make the electrical connection between them easily and appropriately at the same time by means of FPC boards, thus enhancing the workability and assembling capability, and also, implementing the reduction of the manufacturing cost as a lens barrel as a whole.

In order to meet such a requirement as this, a lens barrel of the present invention is provided with a driving mechanism assembly having an FPC board for the driving mechanism unit in which a blur-preventive optical system for preventing images from being blurred, and an image-blur preventive driving mechanism for driving this optical system are incorporated. At the same time, there are arranged a connecting unit which is connected to this board and wired to make connection with the other FPC. There is also provided a sensor unit assembly having an FPC for the sensor unit in which a blur detection sensor is provided for detecting blurring condition, and arranged a connecting unit connected to the sensor unit and wired to make connection with the other FPC at the same time. These FPC boards for both assemblies are coupled with each other to electrically charge them in order to connect and couple them integrally.

Also, in accordance with the invention, a lens barrel is arranged to couple the FPC board for the driving mechanism unit and the FPC board for the sensor unit with each other so that these boards are electrically charged in the space formed on the outer circumference of the fixed cylindrical unit constituting the driving mechanism assembly. In this way, it is made possible to connect and couple both boards integrally.

In accordance with the present invention, the driving mechanism assembly having the image-blur preventive driving mechanism and others incorporated in it, and the sensor unit assembly having the blur detection sensor incorporated in it are separately assembled, and after the positional adjustment and other related operation is performed in each unit, these boards are connected and coupled integrally. In this way, it is possible to obtain a lens barrel having a blur preventive mechanism.

Further, in accordance with the present invention, each of the FPC boards is incorporated in each assembly which is structured separately as described above, and also, the connecting unit provided for each FPC board is coupled with each other when the boards are connected and coupled.

Therefore, it is possible to secure the electrically charged conditions on both units. In this way, it is possible to obtain an excellent lens barrel in terms of the assembling capability, reliability, and the like.

Moreover, in accordance with the present invention, the FPC for the driving mechanism unit and the FPC for the sensor unit are connected in the space on the outer circumference of the fixed cylindrical member in the driving mechanism assembly. Therefore, it is possible to easily make connection with the portion where the other mechanism is incorporated, and to increase flexibility when installing a circuit controller for the control of a lens barrel as a whole.

It is still another object of the present invention to obtain an apparatus for incorporating a blur detection sensor which makes it possible to perform the appropriate connection of the blur detection sensor, the printed-circuit assembling board having this sensor assembled on it, and the external wiring connection for this board extremely easily, thus enhancing the workability, and shortening the operating time at the same time.

To meet such a requirement as this, an apparatus for incorporating a blur detection sensor in accordance with the present invention comprises a fixing member having a flat portion on its outer surface; a printed-circuit assembling board arranged on the flat portion in a state that its fixing position can be freely adjusted, with a blur detection sensor being assembled on it together with a connector for external wiring connection which is also electrically connected to the blur detection sensor; and wiring means such as a flexible printed-circuit board (hereinafter referred to as an FPC board) or lead lines which are connected from outside to the connector of the printed-circuit assembling board.

Also, in the apparatus for incorporating the blur detection sensor according to the present invention, there are formed in the front and back of the flat portion of the fixed member, the walls which are planted to stand in the direction perpendicular to the flat portion, and then, arranged the wiring means such as an FPC board or lead lines connected and coupled to the connector in the form of an arch in the cut-off portion provided for the wall on the side opposite to the connector with respect to the blur detection sensor so that it does not intervene with the blur detection sensor.

In accordance with the present invention, the output signals of the blur detection sensor are provided by wiring means such that the connector for external wiring connection prearranged on the printed-circuit assembling board, and the FPC board connected and coupled with this connector, lead lines, or the like in place of the conventional method of soldering lead lines, thus making it unnecessary for each of the lead lines to be soldered to each of the terminals one by one. The electrical connection and coupling are possible just by inserting the FPC board into the connector, hence implementing the enhancement of workability and shortening the operating time as well.

Also, in accordance with the present invention, the wiring means such as the FPC board or the lead lines are arranged from the connector in the form of an arch across over the blur detection sensor. Therefore, even after assembling, there is no possibility that the wiring means such as the FPC board abuts upon the blur detection sensor, thus making it possible to eliminate the drawbacks, among others, that the defective output signals are mechanically caused by the vibration of the wiring means and the defective output signals are electrically caused by the contact between the wiring means and the blur detection sensor.

DETAILED DESCRIPTION OF THE PREFERRED EMBODIMENTS

Figure 1:
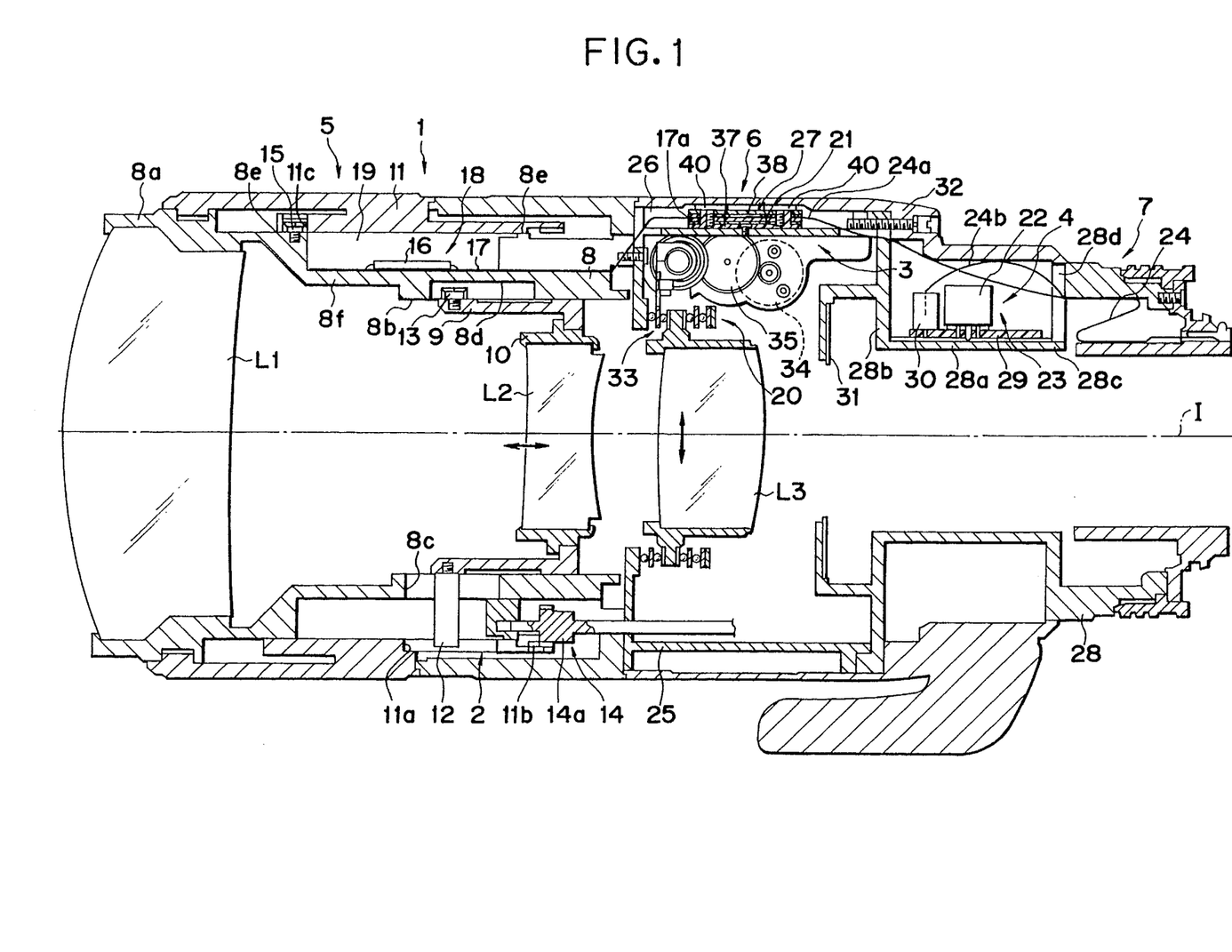
FIG. 1 is a diagram of a vertically sectional side view of a preferred embodiment of a lens barrel according to the present invention, and schematically represents the entire body of the lens barrel.

FIG. 1 shows a lens barrel according to a preferred embodiment of the present invention. In conjunction with FIG. 1, the description will be made of a case where an exchangeable lens barrel 1 detachably mountable on a single-lens reflex camera is applied as the lens barrel of the present embodiment.

Here, in the present embodiment, as seen in FIG. 1, there are incorporated in the lens barrel 1, an AF (autofocus) mechanism 2 for performing an automatic focusing, an image-blur preventive mechanism 3 for preventing an image from being blurred due to a camera-shake or the like caused by the photographer, and a blur detection sensor unit 4 for detecting the state of image blurring, among others.

To describe them in detail, the lens barrel 1 comprises a front barrel assembly 5 where the AF mechanism 2 is incorporated; an intermediate barrel assembly 6 serving as a driving mechanism unit assembly where the image-blur protective mechanism 3 is incorporated, and a rear barrel assembly 7 where the blur detection sensor unit 4 is incorporated, and at the same time, its rear end can be detachably mounted on the main body side of a camera which is not shown.

Also, this lens barrel 1 comprises a first lens unit L1, a second lens unit L2, and a third lens unit L3 serving as the optical system of the photographic lenses.

Here, the first lens unit L1 is formed by lenses on the fixed side which are positioned on the front end of the lens barrel 1. Also, the second lens unit L2 is a unit of focusing lenses supported in the lens barrel 1 movably forward and backward in the direction of the optical axis in order to perform focusing; and the third lens unit L3 is a unit of image-blur preventive lenses to prevent the image of an object from being blurred on the focusing plane of a film due to a camera-shake or the like by being allowed to shift in the directions of intersecting two axes, that is, the directions of X and Y axes, in a plane orthogonal to the optical axis I.

The front barrel assembly 5 is provided with a fixed cylinder 8. The first lens unit L1 is supported by the lens holding frame 8a arranged on the front end side of this fixed cylinder 8. In this fixed cylinder 8, the outer circumference of the movable cylinder 9 is fitted into and held by the inner circumference 8b of the intermediate assembly 6, thus making it possible to shift the movable cylinder 9 forward and backward in the optical direction I. Also, on the rear end side of the movable cylinder 9, a lens frame 10 is provided to support the second lens unit L2.

Further, on the outer circumference of the fixed cylinder 8 on the front end side, the rotary cylinder 11 is rotatively arranged as a rotational cylindrical member which is fitted onto the external side of the fixed cylinder 8 to serve as a focus ring in order to shift the second lens unit L2 forward and backward in the optical axis. Then by the rotation of this rotary cylinder 11, the movable cylinder 9 is caused to shift in the direction of the optical axis. Interlocked with this shift, the second lens unit L2 in the lens frame 10 is allowed to shift for focusing.

In this respect, on the outer circumference of the movable cylinder 9, interlocking pins 12 and 13 are planted to stand. One of the interlocking pins 12 extrudes in the radial direction through the escape 8c of the fixed cylinder 8 to fit in the lead groove 11a which serves as a spirally formed guiding groove arranged in the intermediate portion of the rotary cylinder 11. The other interlocking pin 13 fits in the guiding groove 8d of a straight key type which is formed on the inner circumferential surface 8b of the fixed cylinder 8.

Then, as well known, by means of the interlocking pins 12 and 13 of the movable cylinder 9 which fit in the spiral guide groove 11a and the guide groove 8d of the straight key type, the movable cylinder 9 and the second lens unit L2 supported thereby are caused to shift forward and backward in the direction of the optical axis following the rotation of the rotary cylinder 11.

Here, on the rear end of the rotary cylinder 11, a segment gear 11b is formed to couple with a transmission gear 14a (partially shown in FIG. 1) of a power transmission shaft 14 of the camera main body by engaging with each other.

Further, on the inner circumference of the rotary cylinder 11 on the front side, a circumferential groove 11c is formed. A pin 15 planted on the fixed cylinder 8 fits in this groove to support the rotary cylinder 11 in a state that it is only allowed to rotate while its movement in the direction of the optical axis being regulated.

With the front barrel assembly 5 thus structured, a focusing is performed by the second lens unit L2 as given below.

In other words, when the power transmission shaft 14 rotates, the rotary cylinder 11 is caused to rotate through the engagement of the transmission gear 14a and the segment gear 11b. Here, since the movement of the rotary cylinder 11 in the direction of the optical axis is regulated by means of the pin 15, only its rotation is allowed.

Then by the rotation of the rotary cylinder 11, the rotational power is transmitted to the interlocking pin 12 which is planted on the movable cylinder 9. However, since the movable cylinder 9 is only allowed by the interlocking pin 13 to move straightly in the direction of the optical axis, the interlocking pin 12 shifts in the lead groove 11a of the rotary cylinder 11 in the direction of the optical axis.

As a result, the movable cylinder 9 is caused to shift in the direction of the optical axis, thus enabling the second lens unit L2 to be interlocked therewith to operate for focusing.

Now, in accordance with this invention, when the circuit assembly 18 structured by an FPC board 17 serving as a printed-circuit board where various electric components are assembled including a CPU 16 is arranged to be incorporated in a lens barrel 1 described above in a portion of the fixed cylinder 8 having the rotary cylinder 11 serving as the rotational cylindrical member mounted on the outer side thereof, a small diametral portion 8f whose diameter is smaller than the portion 8e where the rotary cylinder 11 of the fixed cylinder 8 is rotatively fitted. Then it is featured according to the invention that the circuit assembly 18 formed by the FPC board 17 is arranged on this small diametral portion 8f of the fixed cylinder 8 in the space 19 formed between the outer side of the small diametral portion 8f and the rotary cylinder 11.

To describe this arrangement in more detail, the fixed cylinder 8 is provided with the fitting parts 8e and 8e on two locations on both sides of its outer circumference to engage with the rotary cylinder 11, and then, the small diametral portion 8f is arranged between these fitting parts 8e. Thus in the space 19 formed between the outer side of this small diametral portion 8f and the inner side of the rotary cylinder in the fixed cylinder 8, the FPC board 17 having various electric parts including the CPU 16 is arranged as the circuit assembly 18.

In this respect, the FPC board 17 is fixed to the outer side of the small diametral portion 8f of the fixed cylinder 8 appropriately by use of an adhesive double coated tape or some other bonding means.

Also, the outer side of the small diametral portion 8f in the fixed cylinder 8 where the FPC board 17 is mounted may be made a simple circumferential configuration, but it may be configured to provide a flat plane such as a polygonal shape.

Then, on the small diametral portion 8f of the fixed cylinder 8, the FPC board 17 serving the circuit assembly 18 should preferably be mounted appropriately in the circumferential direction on the outer side of the fixed cylinder 8 where any arrangement of the interlocking pin 12 and its escape portion 8c is avoided. In this way, the FPC board and others can be assembled efficiently, easily, and appropriately.

Thus, with the structure described above, it is possible to arrange the circuit assembly 18 having a printed-circuit board such as the FPC board 17 directly installed on it to be mounted on the outer side of the small diametral portion 8f of the fixed cylinder 8 directly, independent of the rotary cylinder 11. As a result, unlike the prior art, the bent plate and other mounting parts which should be provided extendedly around the rotary cylinder 11 can be dispensed with. Hence the structure is simplified so that all the problems related to the workability, the assembly, the increased cost, and the like can be solved.

Also, with the structure described above, the pair of interlocking pins 12 and 13 cause the movable cylinder 9 movably supported in the fixed cylinder 8 in the direction of the optical axis to shift in that direction, thus being allowed to fit in the spirally formed guiding groove 11a and the straight-lined guiding groove 8d provided in the fixed cylinder 8 and the rotary cylinder 11 fitted onto it, respectively. In this way, the movable cylinder 9 and the lens frame 10 for the second lens unit L2 provided on it are caused to shift as required in the direction of the optical axis following the rotation of the rotary cylinder 11.

Here, it is necessary to make the interlocking pin 12 slightly longer for obtaining the movement of the second lens unit L2 in the direction of the axial axis following the rotation of the rotary cylinder 11 because of the presence of the space 19 for mounting the circuit assembly 18 having the FPC board 17 and others. However, there is no problem if only this interlocking pin 12 can be planted with a sufficient strength with respect to the movable cylinder 11, and it is possible to perform the operation of the required lens driving for focusing and other related operations. Also, as described above, in performing the focusing operation, the rotary cylinder 11 and various other parts are caused to rotate, but the circuit assembly 18 formed by the FPC board 17 does not create any problem that may intervene with the parts on the rational side because this assembly is positioned in the space 19 between the small diametral portion 8f of the fixed cylinder 8, and the rotary cylinder 11.

In this respect, the present invention is not limited to the structure described in the embodiment described above. It should be easily understandable to those skilled in the art that each configuration, structure, and the like in the lens barrel 1 can be varied or modified freely, and that various examples of modification are conceivable.

For example, in the embodiment described above, the FPC board 17 (flexible printed board) is exemplified as a printed-circuit board on which various electric components are assembled including the CPU 16, but the present invention is not necessarily limited thereto. It should be good enough if only electric components can be assembled, with circuits and wiring being arranged at the same time. It is of course possible to adopt a rigid base board or the like.

Also, in the embodiment described above, the rotary cylinder 11 is exemplified as a focus ring which can be fitted rotatively onto the outer side of the fixed cylinder 8 as a rotational cylindrical member, but the present invention is not necessarily limited thereto. For example, it may be possible to adopt a zooming ring or the like if only it is a rotational cylindrical member similar to the one exemplified. In short, it will suffice if only the member is applicable to a portion where a printed-circuit board of a type having electric components assembled on it is mounted with respect to the fixed cylinder on which the rotational cylindrical member is fitted.

Further, in the embodiment described above, the description has been made of a case where the present invention is applicable to a single-lens reflex camera, but the invention is not necessarily limited thereto. It can demonstrate an equal effect when adopted in a case wherein a printed-circuit board having electric components assembled on it is arranged between a fixed cylinder in a lens barrel of various kinds of cameras, and a rotational cylindrical member fitted onto the outer side of the fixed cylinder.

As set forth above, in accordance with a lens barrel of the present invention, there is provided a small diametral portion whose diameter is smaller than the fitting portion where a rotational cylindrical member is rotatively fitted onto the outer side of a fixed cylinder, and then, a printed-circuit board formed by an FPC board having various electric components assembled on it is arranged on the small diametral portion of the fixed cylinder in a space formed between the outer side of this small diametral portion and the rotational cylindrical member. Thus, although the structure is simple, many excellent effects can be demonstrated as given below.

In other words, in accordance with the invention, a space is provided between the small diametral portion which is provided for the fixed cylinder, and the rotational cylindrical member which is fitted onto the outer side of that portion, and a printed-circuit board is directly arranged on the mounting portion on the fixed cylinder by utilizing that space ingeniously. As a result, there is no need for any bent plate and other installation members for mounting the circuit board as in the prior art, thus making it possible to curtail the number of parts, simplify the structure, and implement the enhancement of the workability and assembling capability for the significant reduction of manufacturing cost.

Also, in accordance with the invention, a supporting cylinder is installed in the fixed cylinder for holding the photographic optical system, and at the same time, there is provided a movable cylinder which is movably supported in the direction of the optical axis by allowing it to be fitted to the inner circumference of the fixed cylinder, together with a pair of interlocking pins which are planted on this movable cylinder, and then, these interlocking pins are arranged to fit in each of the guiding grooves in order to shift the movable cylinders of the fixed cylinder and rotational cylindrical member in the direction of the optical axis. Therefore, although the structure is simple, an advantage can be obtained that the photographic optical system in the fixed cylinder is allowed to shift as desired in the direction of the optical axis following the rotation of the rotational cylindrical member.

Figure 2:
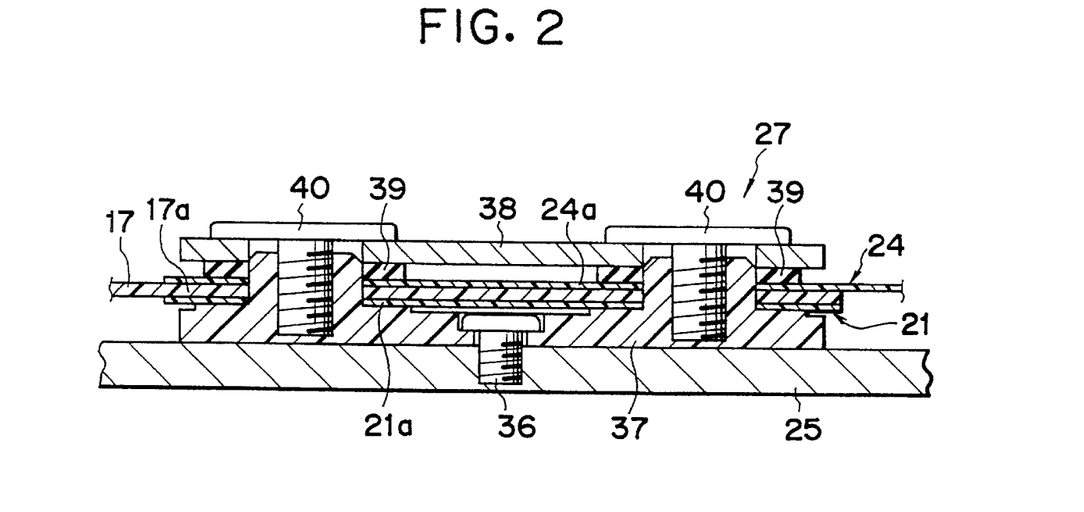
FIG. 2 is an enlarged diagram showing the principal part of the portion where FPC boards are coupled to each other in a lens barrel according to the present invention.

Now, in accordance with the invention, there are incorporated, as clearly seen in FIG. 1 and FIG. 2, a blur-preventive lens unit (the third lens unit L3) and an image-blur preventive driving mechanism 20, and at the same time, an intermediate assembly 6 serving as a driving mechanism assembly having an FPC board 21 for the driving mechanism unit which is wired by being connected to the image-blur preventive driving mechanism, and also, provided with a connecting unit 21a to couple this board with the other FPC board; a blur detection sensor 22; and a rear assembly 7 serving as a second unit assembly having an FPC board 24 for the sensor unit which is wired by being connected to the sensor assembly, and also, provided with a connecting unit 24a to couple this board with the other FPC board. Then by coupling the connecting units 21a and 24a with each other to electrically charge the FPC boards 21 and 24 of both assemblies 6 and 7, thus enabling the boards 21 and 24 to be integrally connected as a feature of the present invention.

Here, according to the present embodiment, the connecting units 21a and 24a of the FPC board 21 for the driving mechanism and the FPC 24 for the sensor unit are coupled by electrically charging them by means of a connecting unit 27 which conducts a pressure contact as exemplified in FIG. 2 in the space 26 formed by a gap provided on the outer circumference of the fixed cylinder 25 which constitutes the intermediate assembly 6. In this way, both boards 21 and 24 are connected and coupled integrally.

With the structure described above, it is possible to separately assemble the front assembly 5 where the AF mechanism 2 and others are incorporated, the driving mechanism assembly 6 where the image-blur preventive driving mechanism 20 and others are incorporated, and the sensor unit assembly 7 where the blur detection sensor 22 is incorporated, and then, conduct the positional adjustment for each of the assemblies 5, 6, and 7 particularly including the positional adjustment of the blur detection sensor 22 (on the X- and Y-axis sides), thus, subsequently, these assemblies being integrally connected to provide the lens barrel 1 which is provided with the blur-preventive function.

Moreover, since it is possible to arrange the FPC boards respectively in the assemblies 5, 6, and 7 which are separately structured as described above, the FPC boards 17, 21, and 24 are incorporated in each of them and each connecting unit of the boards is integrally connected to secure the electrically charged conditions of the assemblies, hence presenting excellent assembling workability and reliability among others.

Here, in FIG. 1, a reference numeral 28 designates the fixed cylinder serving as the fixed member constituting the rear assembly 7. This fixed cylinder 28 is connected to the fixed cylinder 8 of the front assembly 5 to be integrally formed together with the fixed cylindrical unit 25 constituting the intermediate assembly 6.

In this respect, the rear end of the fixed cylinder 28 of the rear assembly 7 is detachably mounted on the main body side of the camera which is not shown.

Also, in FIG. 1, a reference numeral 29 designates the printed-circuit assembling board formed by a rigid board such as a glass epoxy board having the blur detection sensor 22 assembled on it and the wiring pattern on the reverse side thereof; 30, a connector for connecting the sensor 22 assembled on the printed-circuit assembling board 29 and the branching section 24b of the FPC board 24, thus constituting the sensor assembly 23 in a part of the space available in the fixed cylinder unit 28.

In this respect, a reference numeral 31 in FIG. 1 designates an aperture mechanism arranged in the rear assembly 7, and 32, a covering cylinder fitted onto this mechanism so that these members are integrally formed after the required components are mounted on the fixed cylinder unit 25 of the intermediate assembly 6 and the fixed cylinder unit 28 of the rear assembly 7, and the assembly adjustment is appropriately made for these members.

Also, the image-blur preventive driving mechanism 20 described above is provided with driving units for driving in the Y- and X-axis directions the image-blur preventive lens (the third lens unit L3) movably supported by the supporting mechanism 33 in the plane perpendicular to the optical axis I. For each of the units, an electric motor 34, a gear train 35 for transmitting the driving power, and others are provided, but the detailed description thereof will be omitted.

In this respect, in an image-blur preventive driving mechanism 20 of the kind, the electric motor 34 and sensor and others for detecting its driving state are not shown, but these members are of course connected to a part of the FPC board 21 for the driving mechanism described above.

Also, the connecting unit 27 arranged by pressure contact of the FPC boards 17, 21, 24 described above is structured in such a manner that as shown in FIG. 2, between an installation stand 37 made of resin fixed by a screw 36 to the fixed cylinder unit 25, and a board member 38 arranged above this stand, the connecting unit 21a of the FPC board 21 for the driving mechanism and the connecting unit 24a of the FPC 24 for the sensor unit, and further, the connecting unit 17a of the FPC board 17 on the main body side are laminated on each other, and are pinched with the inclusion of elastic members 39 and 39 made of rubber or the like, thus being press fixed by means of screws 40 and 40 as a whole.

Here, in the connecting unit 27 by means of pressure contact as described above according to the present embodiment, the connecting unit 17a of the FPC board 17 on the main body side having the circuit assembly 18 including the AF mechanism 2 of the front assembly 5 described earlier, and the controller which intensively controls the driving of each mechanism in the lens barrel 1 is also connected by means of a three-layered pressure contact.

In this respect, this contact unit 17a on the main body side is of a boule-faced wiring type as a matter of course so that the electrical charge is made possible when pinched by the FPC boards 21 and 24 on both sides.

In this way, each of the mechanisms incorporated in the front, intermediate, and rear assemblies 5, 6, and 7 is made communicational by the electric charge by means of the connecting unit 27 by the pressure contact. The advantage of this arrangement is significant.

Also, in the structure described above, the connection is made between the FPC board 21 for the driving mechanism and the FPC board 24 for the sensor unit in the space 26 formed by the gap on the outer circumference of the fixed cylinder unit 25 in the driving mechanism assembly 6. Therefore, it is extremely easy to make connection with the front assembly 5 and others where the AF mechanism 2 and the like are incorporated, and also, enhance the flexibility when the controller is installed for the intensive control of the lens barrel as a whole.

For example, it can be arranged to structure the front assembly 5 having the AF mechanism 2 separately, and perform the connection of the FPC board 17 for it at the same time, thus obtaining an advantage that the assembling capability is enhanced, the adjustment can be made easily with respect to the AF mechanism 2 and the blur-preventive driving mechanism 20 among others.

Then, according to the structure of the present embodiment, a lens barrel 1 can be separately arranged into three assemblies, a front, an intermediate, and a rear assemblies 5, 6, and 7. Then each of them is preassembled and adjusted for the intended assembling. These can be performed simply and reliably, and then, only after that, the whole part is assembled integrally to provide a lens barrel 1.

In other words, when adjusting the assemblies, communications are made possible by press contacting the connecting unit of an adjustment tool or a communication tool appropriately with the connecting units of the FPC boards 17, 21, 24 of the assemblies 5, 6, and 7, respectively. In this way, the adjustment can be carried out individually in a state that these are assembled.

Therefore, it is possible to eliminate the defective rotational adjustment of the driving mechanism, and the problem of lowered precision when positioning the blur detection sensor 22.

In this respect, the present invention is not limited to the structure in the embodiment described above. It should be readily understandable to those skilled in the art that the configuration, structure, and others of each unit in the lens barrel 1 can be freely varied and modified appropriately, and that various examples of modifications are conceivable.

For example, in the embodiment described above, it is arranged that each of the assembles 5, 6, and 7 is assembled individually and adjusted by the connecting unit 27 formed by three-layered press contact including the FPC board 17 on the main body side, and then, these assemblies are integrally formed, but the invention is not limited thereto. It is also possible to obtain the required effect if only the sensor assembly 7 having the blur detection sensor 22 whose adjustment is most difficult and complicated is separately structured from the driving mechanism assembly 6 having the image-blur preventive mechanism 20.

Also, the connecting unit 27 of each of the FPC boards 17, 21, 24 are not necessarily limited to the press contact connection represented in the embodiment described above. For example, connectors and other connecting means can be used as a matter of course.

Further, in the embodiment described above, the description has been made of a case where the invention is applied to a lens barrel 1 installed on a single-lens reflex camera, but the invention is not limited thereto. It is applicable to the lens barrel of various kinds of camera which is provided with an image-blur preventive mechanism, and is equally capable of demonstrating the effects referred to in the embodiment.

As set forth above, in accordance with a lens barrel of the present invention, there are provided a driving mechanism assembly in which a blur-preventive optical system to prevent images from being blurred, and a blur-preventive driving system for driving this system are incorporated; and at the same time, an FPC board for the driving mechanism unit which is wired and connected to these incorporated system and mechanism, and also, provided with a connecting unit formed on it for connection with the other FPC board; and a sensor assembly in which a blur detection sensor is incorporated for making blur detection;, and at the same time, an FPC board for the sensor unit which is wired and connected with the sensor assembly, and also, provided with a connecting unit formed on it for connection with the other FPC. Thus the connecting units of both FPC boards for the assemblies are coupled with each other and electrically charged to connect both boards integrally. Therefore, although the structure is simple, various excellent effects can be demonstrated as listed hereunder.

In other words, according to the invention, it is possible to separately assemble the driving mechanism assembly where the image-blur preventive mechanism and others are incorporated, and the sensor unit assembly where the blur detection sensor is incorporated. As a result, these assemblies can be connected and coupled integrally after each individual positional adjustment is made for the respective units, and particularly, the positional adjustment and others for the sensor unit are performed individually for its assembly. In this way, the adjustment operation can be carried out easily.

As a result, it is possible to enhance the assembling capability and reliability including the positional adjustment operation in the assembling parts for the image-blur preventive driving mechanism and the blur detection sensor in the lens barrel having the image-blur preventive function, and to make simply and appropriately the electrical connection between them at the same time by means of the FPC boards so that the enhancement of the workability and assembling capability can be implemented to reduce the manufacturing cost of a lens barrel as a whole.

Further, in accordance with the invention, each of the FPC boards can be incorporated in each assembly which is separately structured, and the connecting units provided for the FPC boards are connected with each other when the boards are coupled so that an electrically charged condition can be secured on both units. Therefore, it is possible to obtain a lens barrel which provides excellent assembling capability and reliability, and also, enables the implementation of a significant cost reduction.

Particularly, with a structure of the kind, when adjusting the sensor unit, there is no need for rotating the parts where the driving mechanism, the AF mechanism, and others are incorporated, thus making it possible to eliminate the causes of defective adjustments that may otherwise tend to occur at that time.

Also, in accordance with the lens barrel of the present invention, the FPC board for the driving mechanism unit and the FPC board for the sensor unit can be electrically connected and coupled in the space formed on the outer circumference of the fixed cylinder unit constituting the driving mechanism assembly so that these boards are electrically charged. Thus not only it is easy to connect the FPC board for the driving mechanism unit and the FPC board for the sensor unit, but also, to complete connection easily with the part where the other mechanism is incorporated. Further, there is an advantage, among others, that the flexibility is increased in mounting the circuit controller for the entire system of the lens barrel.

Figure 3:
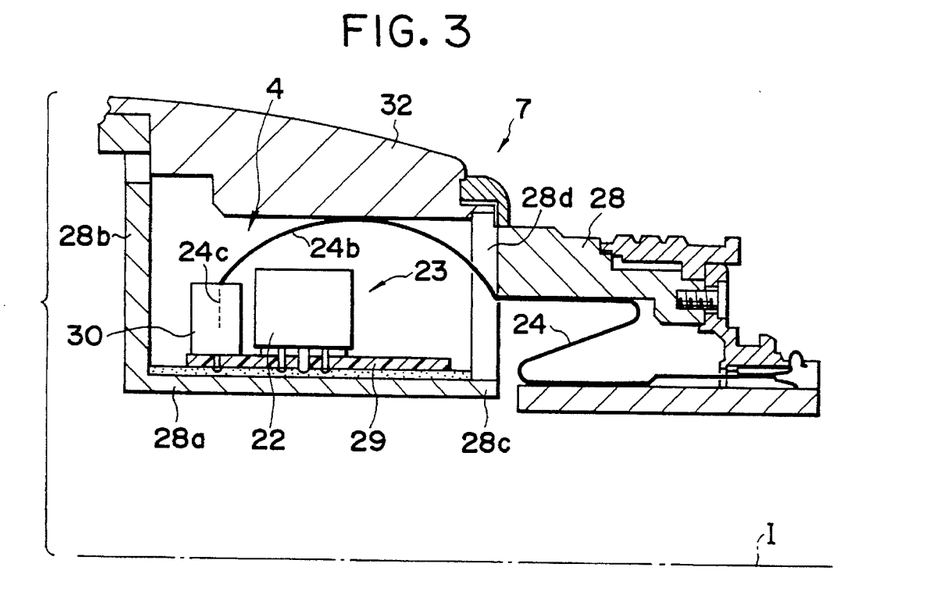
FIG. 3 is an enlarged sectional diagram showing a preferred embodiment of a lens barrel to which a blur detection sensor of the present invention is incorporated, and also, a portion where the blur detection sensor is incorporated.

Now, in accordance with the present invention, its characteristic structure is such that in the rear assembly 7 of the lens barrel 1, there are provided, as clear from FIG. 3, the fixed cylinder 28 having a flat portion formed on a part of its outer surface side corresponding to the sensor assembly 23; the printed-circuit assembling board 29 arranged on this flat portion with flexibility to adjust its fixing position, and also, provided with the blur detection sensor 22 together with a connector 30 for use of the external wiring which is electrically connected with the sensor; and the FPC board (a branching section 24b of the FPC board 24 for the sensor unit) serving as wiring means to be connected from the outside to the connector 30 of the printed-circuit assembling board 29.

Then, with a structure of the kind according to the present invention, it is possible to easily connect the blur detection sensor 22 just by inserting it into the connector 30 of the FPC board 24 unlike the conventional barrel in which a plurality of lead lines are used for connecting the blur detection sensor 22, and then, these lines are soldered directly on the printed-circuit assembling board 29 for electrical connection. Therefore, the assembling and wiring operations can be carried out extremely easily and appropriately with respect to the blur detection sensor 22, the printed-circuit assembling board 29 for assembling the sensor, and further, the FPC board 24b for performing the external wiring connection for the printed-circuit assembling board 29, thus making it possible to enhance the workability and shorten the working hours.

Moreover, with a structure of the kind, it is possible to carry out the positional adjustment of the blur detection sensor 22 reliably in a good precision for the provision of an excellent detection accuracy. Particularly, a blur detection sensor 22 of the kind is arranged each in the X- and Y-axis directions as described earlier. Therefore, it is desired that the positional adjustment should be executed easily for the pair of sensors 22 and 22, respectively, and the external wiring should easily be connected only after such adjustments. With this in view, the advantage of the present invention is significant.

Here, according to the present embodiment, in the front and back of the flat portion (at 28a in FIG. 3) where the sensor assembly 23 of the fixed cylinder 28 is arranged, the walls 28b and 28c are formed to stand in the direction rectangular to this flat portion 28a, and then, for the FPC board 24b connected to the connector 30 in a state being surrounded by the walls, the wiring is arranged in the form of an arch in the cut-off portion 28d provided for the wall 28c positioned on the side opposite to the connector 30 with respect to the blur detection sensor 22 in order to prevent the wiring from intervening with the blur detection sensor 22.

With this structure, the connecting end 24c of the FPC board 24b is wired from the connector 30 in the form of an arch over the blur detection sensor 22. Therefore, even after assembling, the FPC board 24b can maintain such form by the elasticity of its own so that it does not abut upon the blur detection sensor 22, hence making it possible to eliminate the drawbacks that the defective output signals are mechanically caused by the vibration of the FPC board 24b, and the defective output signals are electrically caused by the contact between the FPC board 24b and the blur detection sensor 22.

In this respect, according to the present embodiment, the FPC board 24b is connected to the connector 30 across over the blur detection sensor 22 in the form of an arch, but this arrangement is made in order to eliminate the difficulty with which the FPC board 24b is inserted for connection because if the connector 30 on the assembling board 29 should be arranged on the aforesaid cut-off portion 28d side, it becomes necessary to bend the FPC board 24b abruptly for assembling due to the limited space available with respect to the fixed cylinder 28.

Figure 4:
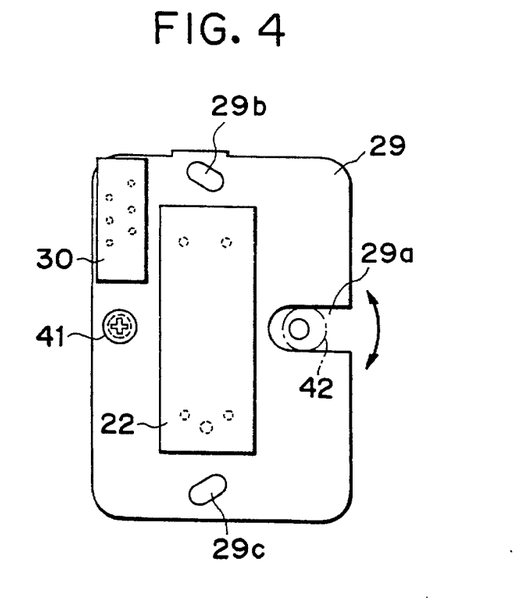
FIG. 4 is a schematic diagram showing an example of means in an apparatus for incorporating a blur detection sensor of the present invention for adjusting the position of the assembly board having a blur detection sensor assembled on it.

Also, in the present embodiment, the printed-circuit assembling board 29 having the aforesaid blur detection sensor 22 is assembled on it is arranged on the flat portion 28a of the fixed cylinder 28 in a state of being adjustable as shown in FIG. 4, for example.

In other words, the blur detection sensor 22 and the connector 30 are assembled on the assembling board 29 by means of plural numbers of pins and are connected appropriately by means of the conductive patterns provided on the reverse side of the assembling board 29.

In FIG. 4, a reference numeral 41 designates a stepped screw for fixing the assembling board 29 on the flat portion 28a in a state of supporting it swingingly and rotatively, and 42, an eccentric pint provided on the flat portion 28a to be extruded into the groove 29a which is formed by cutting off a part of the assembling board 29 in a position corresponding to this eccentric pin. The positional adjustment of the sensor 22 is made by rotating this eccentric pin 42 appropriately to swingingly rotate the assembling board 29.

Here, in FIG. 4, reference numerals 29b and 29c designate elongated holes provided in the other positions on the assembling board 29 for use of fixation. In these elongated holes, stopper screws (not shown) are driven in after required positional adjustments in order to fix the assembling board 29 to the flat portion 28a in a given state.

However, it is conceivable that as an adjustable structure of the assembling board 29 for a sensor of the kind, appropriate modifications can be exemplified, not necessarily confined to the structure described above.

In this respect, the present invention is not limited to the structure described above in the present embodiment. It should be readily understandable to those skilled in the art that the configuration, structure, and the like of each unit in the lens barrel 1 can be freely varied and modified appropriately, thus making it conceivable to provide examples of various modifications.

For example, in the embodiment described above, the description has been made of a case of using the FPC board 24b serving as wiring means connected and coupled to the connector 30 arranged on the printed-circuit assembling board 29 having the blur detection sensor 22 is assembled, but the present invention is not necessarily limited thereto. It is of course possible to use lead lines as wiring means and connect them to the connector 30.

Further, in the embodiment described above, the description has been made of a case where the present invention is applied to a lens barrel 1 having a blur preventive function which is installed in a single-lens reflex camera, but it is not necessarily limited thereto. The present invention can demonstrate the effects even when it is applied to various equipment and apparatuses in which a blur detection sensor is incorporated.

As described above, in accordance with the present invention, an apparatus for incorporating a blur detection sensor is provided with a fixing member having a flat portion on the outer side thereof; a printed-circuit assembling board having a connector for use of connection with the external wiring, which is arranged on the flat portion in a state of being adjustable with respect to its fixing position, and also, electrically connected with the blur detection sensor; and wiring means such as an FPC board or lead lines which can be connected from the outside to the connector of the printed-circuit assembling board. Therefore, although the structure is simple, it is possible to demonstrate various excellent effects listed hereunder.

In other words, with a structure of the kind according to the present invention, it is possible to easily connect the blur detection sensor just by inserting it into the connector of connecting means such as an FPC board or lead lines unlike the conventional barrel in which a plurality of lead lines are used for connecting the blur detection sensor, and then, these lines are soldered directly on the printed-circuit assembling board for electrical connection. Therefore, the assembling and wiring operations can be carried out extremely easily and appropriately with respect to the blur detection sensor, the printed-circuit assembling board for assembling it thereon, and further, the connecting means for performing the external wiring connection for the printed-circuit assembling board, thus making it possible to enhance the workability and shorten the operational time.

Moreover, with a structure of the kind, it is possible to carry out the positional adjustment of the blur detection sensor reliably in a good precision for the provision of an excellent detection accuracy.

Also, according to an apparatus of the present invention for incorporating a blur detection sensor, the walls are arranged in the front and back of the flat portion to stand in the direction perpendicular to this flat portion. Then the wiring means such as the FPC board and the like connected and coupled with the connector is arranged in the form of an arch in the cutting off portion provided on the wall on the side opposite to the connector with respect to the blur detection sensor. In this way, the wiring means is not allowed to intervene with the blur detection sensor. As a result, it is possible to demonstrate an excellent effect given below.

In other words, the wiring means, an FPC board or the like, is arranged from the connector in the form of an arch across over the blur detection sensor. Thus even after assembling, there is no possibility that the wiring means, an FPC or the like, abuts upon the blur detection sensor, hence making it possible to eliminate the drawbacks that the defective output signals are mechanically caused by the vibration of the wiring means, an FPC or the like, and the defective output signals are electrically caused by the contact of the wiring means and the blur detection sensor.

What is claimed is:

1. A lens barrel including the following:

a fixed cylinder for holding a photographic optical system; and a rotary cylinder surrounding said fixed cylinder, said fixed cylinder having a fitting portion holding said rotary cylinder rotatively, and a diametral portion whose diameter is smaller than said fitting portion; and a printed-circuit board having electric components assembled thereon, said printed-circuit board being arranged on the diametral portion of said fixed cylinder in the space formed between the inner circumference of said rotary cylinder and the diametral portion.

2. A lens barrel according to claim 1, further including the following:

a movable cylinder for holding said photographic optical system and being supported by said fixed cylinder movably in the direction of the optical axis in said fixed cylinder;

a pair of pins extendedly arranged in the radial direction on the outer circumference of said movable cylinder; and a first of said pins fitting in a guiding groove provided for said fixed cylinder, and a second of said pins extending through the space formed between the inner circumference of said rotary cylinder and the diametral portion of said fixed cylinder and fitting in a guiding groove provided for said rotary cylinder, thus said movable cylinder being shifted in the direction of the optical axis by the rotation of said rotary cylinder by the cam function provided by said pins and said guiding grooves, and wherein said printed-circuit is arranged to avoid the second of said pins.

3. A lens barrel comprising:

a main optical system;

a first assembly having,
   a blur preventive optical system for preventing images from being blurred by being moved in the plane perpendicular to the optical axis of said main optical system;
   a driving mechanism for driving said blur preventive optical system; and
   a flexible printed board connected to said driving mechanism and provided with a first connecting unit; and a second assembly having,
   a detection sensor for detecting blur; and
   a flexible printed board connected to said detection sensor, and provided with a second connecting unit, said first connecting unit and said second connecting unit being integrally coupled and electrically charged.

4. A lens barrel according to claim 3, wherein said first assembly is further provided with a fixed cylinder, and said first connecting unit and said second connecting unit are integrally coupled and electrically charged on the outer circumference of said fixed cylinder in the space formed between the outer circumference of said fixed cylinder and the outer member of said lens barrel.

5. A lens barrel according to claim 3, wherein said first connecting unit and said second connecting unit are superposed and pressed to be in contact with each other.

6. A lens barrel according to claim 5, wherein said first assembly is further provided with a fixed cylinder, and the portion where said first connecting unit and said second connecting unit are superposed and pressed to be in contact with each other is arranged on the outer circumference of said fixed cylinder in the space formed between the outer circumference of said fixed cylinder and the outer member of said lens barrel.

7. A lens barrel comprising an optical system;

a fixed cylinder having a flat portion on the outer surface thereof;

a printed-circuit board fixed to said flat portion of said fixed cylinder;

an adjustment device for adjusting the fixing position of said printed-circuit board to said flat portion;

a blur detection sensor arranged on said printed-circuit board;

a connector arranged on said printed-circuit board; and wiring means for electrically connecting external electric components to said connector.

8. A lens barrel according to claim 7, wherein said wiring means is a flexible printed board.

9. A lens barrel according to claim 7, wherein said fixed cylinder is provided with a first wall and a second wall extendedly present from said flat portion outwardly in the radial direction;

said printed-circuit board is arranged on said flat portion in the space formed by said first wall and said second wall;

said connector is arranged on the portion near to said first wall on said printed-circuit board;

said blur detection sensor is arranged on the portion near said second wall on said printed-circuit board;

said second wall is provided with a cut-off portion; and said wiring means connected to said connector is electrically connected to the external electric components across over said blur detection sensor in the form of an arch and through said cut-off portion.

10. A lens barrel according to claim 9, wherein said wiring means is a flexible printed board.

11. An apparatus for incorporating a blur detection sensor comprising a fixed member having a flat portion on the outer surface thereof;

a printed-circuit board fixed to said flat portion of said fixed member;

an adjustment device for adjusting the fixing position of said printed-circuit board to said flat portion;

a blur detection sensor arranged on said printed-circuit board;

a connector arranged on said printed-circuit board; and wiring means for electrically connecting external electric components to said connector.

12. An apparatus according to claim 11, wherein said wiring means is a flexible printed board.

13. A lens barrel according to claim 11, wherein said fixed member is provided with a first wall and a second wall perpendicular to said flat portion;

said printed-circuit board is arranged on said flat portion in the space formed by said first and said second walls;

said connector is arranged in a portion near said first wall on said printed-circuit board;

said blur detection sensor is arranged in a portion near said second wall on said printed-circuit board;

said second wall is provided with a cut-off portion; and said wiring means connected to said connector is electrically connected to external electric components across over said blur detection sensor in the form of an arch and through said cut-off portion.

14. A lens barrel according to claim 13, wherein said wiring means is a flexible printed board.

\* \* \* \* \*